United States Patent [19]

Carrington et al.

[11] 4,247,568
[45] Jan. 27, 1981

[54] PREPARATION OF LOW-CALORIE FOOD INGREDIENTS FROM STARCH

[75] Inventors: Roy Carrington; George Halek, both of Cliftonville, England

[73] Assignee: Pfizer Inc., New York, N.Y.

[21] Appl. No.: 927,858

[22] Filed: Jul. 25, 1978

Related U.S. Application Data

[63] Continuation of Ser. No. 703,629, Jul. 8, 1976, abandoned.

[30] Foreign Application Priority Data

Jul. 21, 1975 [GB] United Kingdom ............... 30401/75

[51] Int. Cl.$^3$ ............................................. A21D 2/16
[52] U.S. Cl. .................................... 426/321; 426/661; 426/804; 426/471; 127/71; 536/110
[58] Field of Search .................... 127/70, 71; 426/661, 426/549, 804, 808, 321, 471; 536/107–110, 48, 49

[56] References Cited

U.S. PATENT DOCUMENTS

| | | | |
|---|---|---|---|
| 2,853,484 | 9/1958 | Lolkema et al. | 536/110 |
| 3,657,010 | 4/1972 | Mitchell et al. | 426/661 |
| 3,732,207 | 5/1973 | Kovats | 536/110 |
| 3,766,165 | 10/1973 | Rennhard | 260/209 R |
| 3,839,320 | 10/1974 | Bauer | 536/110 |
| 4,011,392 | 3/1977 | Rudolph | 536/110 |

FOREIGN PATENT DOCUMENTS 691364  5/1953  United Kingdom ..................... 536/110

OTHER PUBLICATIONS

Hackh's Chemical Dictionary–Ed. Grant, McGraw-Hill Book Co., N.Y., 1969, p. 634.
Condensed Chemical Dictionary–Hawley, 8th Ed., Van Nostrand Reinhold Co., 1971, pp. 269, 704.
Principles of Biochemistry–White, McGraw-Hill, N.Y., 4th Ed., 1968, p. 46.
Kirk–Othmer Encyclopedia of Chemical Technology, v12, 2nd Ed., Interscience Pub., N.Y., 1967, p. 355.

*Primary Examiner*—Hiram H. Bernstein
*Attorney, Agent, or Firm*—Connolly and Hutz

[57]  ABSTRACT

Non-digestible food additives are prepared by heating starch with an edible di- or tri-basic carboxylic acid and anhydrides thereof acid at 140° to 220° C. under reduced pressure and in the presence of less than 5% water for sufficient time to form a non-digestible product.

14 Claims, No Drawings

PREPARATION OF LOW-CALORIE FOOD INGREDIENTS FROM STARCH

This application is a continuation of application Ser. No. 703,629 filed July 8, 1976, now abandoned.

BACKGROUND OF THE INVENTION

The invention relates to novel low-calorie food additives derived from starch and also to processes for preparing such additives by the reaction of food acids with starch and starch derivatives under specified conditions. It also relates to novel uses of such additives when incorporated into food products as non-digestible substitutes for starch and starch-containing products, e.g. flour, and for other saccharides, e.g. sugars, and also as replacements for fatty triglycerides.

It is well known that starch can be modified by heat and/or by reaction with small amounts of mineral acids, alkalis or salts. The products of such processes are known as British gums, Canary dextrins, and the like and some of these products are partly non-digestible. It is also well known that starch can be hydrolyzed in aqueous solution, using acids and/or amylolytic enzymes to effect the hydrolysis, to form partly or wholly hydrolyzed products all of which are, like starch itself, completely digestible. It is also known to produce partial esters of starch with dibasic carboxylic acid such as maleic, fumaric and succinic acids.

U.S. Pat. No. 3,766,165 discloses non-nutritive carbohydrate substitutes prepared by polycondensation of saccharides in the presence of polycarboxylic acid catalyst at reduced pressure. They are prepared by melting a dry saccharide, such as d-glucose or maltose, at a temperature below the point of substantial decomposition of said saccharide, maintaining the molten saccharide at about 140° to 295° C. and at reduced pressure in the presence of a catalytic amount of up to 10 mol percent of a food-acceptable polycarboxylic acid catalyst and in the substantial absence of water until substantial polymerization occurs, and simultaneously removing the water formed during the melting and polymerization.

U.S. Pat. No. 3,732,207 discloses a starch reaction product of dibasic organic acid anhydrides and specifically starch dextrin esters and thin boiling starch esters of dibasic organic anhydrides, preferably succinic or maleic anhydrides. This product is made by an essentially dry process involving the heating of intimately contacted starch or starch dextrin with a dibasic organic acid anhydride at a temperature of 100°–155° C. in the presence of only 0.5 to 15% moisture for selected times to produce a product of 0.02 to 0.04 degree of substitution.

U.S. Pat. No. 3,657,010 discloses the preparation of moisture-stable hydrolyzed starch by heating corn syrup in the presence of acid, preferably fumaric acid, to a temperature of about 300° F. to 370° F. The resultant product is allowed to cool and solidify and is then ground to a dry powder.

SUMMARY OF THE INVENTION

We have discovered that products which are substantially non-digestible can be produced from starch, or partially hydrolyzed starch, by heating the starch or starch hydrolysate under specified conditions in the presence of edible di- or tri-carboxylic acids.

Thus, according to the invention, a process for preparing a non-digestible food additive comprises heating a mixture of starch or a starch hydrolysate with an edible di- or preferably tri-basic carboxylic acid or an anhydride thereof at a temperature of from about 140° to 220° C. under reduced pressure for a period sufficient to form a non-digestible product as determined by its resistance to the action of amylolytic enzymes, the mixture having prior to and during such heating a moisture content of less than 5% by weight of water and containing from 1 to 25% by weight of the edible acid or an equivalent amount of anhydride based on the total weight of the mixture before heating at the said temperature.

Detailed Description of the Invention

By starch hydrolysate is meant a product of partial acidic or enzymatic hydrolysis of starch, which includes products variously known as thin boiling starches, corn syrup solids, white dextrins and amylase dextrins. Such products have dextrose equivalents varying from about 1 to about 70 and always contain a proportion of oligosaccharides, as well as monomeric glucose and the disaccharide maltose. One particularly advantageous form of starch hydrolysate that may be used in the invention is that produced by partial hydrolysis in the presence of the same acid as is to be incorporated in the mixture.

It is envisaged that starches and starch hydrolysates which have been chemically modified to introduce a minor proportion of etherified or esterified hydroxyl groups, e.g. by reaction with alkylene oxides to form ethers or with organic or inorganic acids to form esters, or which have been oxidized to minor extent, may be used as starting materials and their use is included in the invention, as also are physically modified starches such as pre-gelatinized starch.

Edible di- and tri-basic carboxylic acids which may be used include maleic, fumaric, succinic, adipic, malic, tartaric, citric and isocitric acids. The preferred acid is citric acid. Anhydrides which can be used include maleic, succinic and citric anhydrides. As already stated, the edible acid may form from 1 to 25% by weight of the mixture of starch or starch hydrolysate and edible acid before heating. The amount of edible acid used has an important influence on the physical properties of the end product, in particular on the proportion of water-soluble material in the product and on the ability of the insoluble material to take up water. The use of smaller amounts of edible acid increases the proportion of soluble material and the up-take of water by the insoluble material, while the use of larger amounts of edible acid reduces the proportion of soluble material to very low levels, and also reduces the water up-take of the insoluble material. Preferably the amount of edible acid used is in the range from 5 to 15% by weight of the mixture before heating.

It is important for carrying out the invention that the moisture content of the mixture should be low not only prior to but also during heating. The mixture must contain less than 5% water at all times, and preferably less than 2%, by weight of the mixture. The mixture of edible acid and starch or starch hydrolysate may therefore have to be dried, e.g. by heating at a temperature below 120° C., preferably in the range from 60° to 120° C. to reduce its water content to below 5% by weight, before heating in the range 140° to 220° C. is begun. Water is formed by reaction between the carboxyl groups of the edible acid and the hydroxyl groups of the starch or starch hydrolysate, and also by condensation reactions between glucose moieties, and this must be removed continuously from the mixture during heating, by carrying out the heating step under reduced pressure, e.g. at below 100 mm of mercury, preferably below 50 mm of mercury. The pressure may be maintained at the required level by means of a vacuum pump or steam ejector. Operating under reduced pressure also has the advantage of reducing oxidation due to the presence of air, which leads to discoloration of the product. A purge of nitrogen, carbon dioxide or other inert gas may optionally be introduced to remove air and to increase the efficiency of water removal during the heating step.

The temperature of heating in the process according to the invention is in the range from 140° to 220° C. The temperature actually used will depend on the physical nature of the mixture in this temperature range. When the mixture is in the liquid state, e.g. when mixtures containing starch hydrolysates are used, temperatures in the lower part of the range, e.g. 140° to 180° C. may be used. When the mixture is in the solid state, higher temperatures, e.g. 165° to 220° may be used. A temperature of about 180° C. is generally preferred however.

The period for which heating is continued will depend on the nature of the starting materials, the proportion of edible acid, the type of apparatus used for the heating step, and the properties required in the product, as well as on the actual temperature of heating. Thermally more efficient reactions can be carried out in the liquid phase than in the solid phase. Shorter periods can therefore be used when the mixture is in the liquid state, using for example a wiped film evaporator for the heating step, in which residence time of only a few minutes may be required to give a non-digestible product. Longer periods will however have to be used when the mixture is in the solid state and periods of up to 24 hours may then be necessary. The period necessary to give a non-digestible product also depends on the proportion of edible acid present. The lower the proportion of acid, the longer will be the necessary period. The actual period used will depend on the degree of water-solubility or water up-take required in the product. In general the longer the period of heating, the lower will be the proportion of water-soluble material in the product and the water up-take of the insoluble material. Moreover, when a starch hydrolysate is used, shorter periods of heating are required to give a non-digestible product than when starch itself is used, but longer periods of heating will be required to reduce the degree of solubility or water up-take of the product, compared with that required for starch itself. In general, the higher the dextrose equivalent of the starch hydrolysate, the shorter is the period required to give a non-digestible product and the longer will be the period required to reduce the degree of solubility or water up-take of the product to a desired level.

The temperature used will, of course, directly affect the period necessary to give a non-digestible product, and the period required to reduce the degree of solubility or water up-take of the product to the desired level. Obviously the higher the temperature used, the shorter the period will be. Heating for excessive periods at the higher temperatures of the range may, however, result in products having undesirable color formation and cause some degradation and should therefore be avoided. It is preferred to keep the reaction period and temperature to the minimum required to form the desired product and this can be readily determined by experiment. Samples of the product are taken at regular intervals to determine the effect thereon of amylolytic enzymes, and when the product is resistant to the action of such enzymes then a non-digestible product has been formed.

A product is taken to be resistant to the action of amylolytic enzymes when not more than 15%, and preferably not more than 5%, of the product is hydrolyzed by the enzyme under standard conditions, as measured by its dextrose equivalent relative to that of starch. Similarly, the proportion of soluble and insoluble material in the product can be determined by suspending the samples in water under standard conditions and filtering off the insoluble material. The water uptake of the insoluble material can then also be determined by standard methods.

The mixture of starch or starch hydrolysate and edible di- or tri-carboxylic acid may be prepared in a number of ways, before heating at 140° to 220° C. in accordance with invention. Solid materials, e.g. starch or starch hydrolysates of low dextrose equivalent and the edible acid in powder form, can be mixed by conventional solid/solid mixing techniques and then dried to a water content of less than 5% by weight. Alternatively, an aqueous solution of the edible acid may be sprayed onto starch or starch hydrolysate powder in a suitably agitated drier. Preferably, however, starch or starch hydrolysate powder is dispersed in an aqueous solution of the edible acid and the slurry is then dried by conventional techniques, e.g. by spray drying, drying on trays in an oven or drying on a heated roller.

Starch hydrolysates having higher dextrose equivalents are liquid or syrupy materials containing some water. These may be mixed with an aqueous solution of the edible acid, and the mixture dried in conventional apparatus for evaporating aqueous liquids, e.g. a wiped-film or climbing-film evaporator.

As previously mentioned a particularly advantageous method of achieving a mixture of a starch hydrolysate and edible acid, for use in the invention, is to carry out the hydrolysis of the starch in the presence of the edible acid itself. The proportion of edible acid in the mixture may be increased, if desired, by adding further acid after hydrolysis has been carried out to the desired degree of hydrolysis, as determined by the dextrose equivalent of the hydrolysate, and the mixture may then be dried by the methods already described for liquid mixtures and slurries. Alternatively sufficient edible acid to perform the initial starch hydrolysis and the subsequent process of the invention may be added in the first instance and the time required to achieve a particular degree of hydrolysis thereby shortened.

After drying to a moisture content of less than 5%, the mixture, if it is a solid is preferably milled to a small particle size, e.g. less than 150 micron average particle diameter, before the heating step of the invention. Alternatively, if the mixture containing less than 5% moisture is in the liquid phase, e.g. molten, it may then be used directly for the heating step of the invention, in the same apparatus in which the drying step was carried out.

After heating the mixture at a temperature in the range from 140° to 220° C., in accordance with the invention, the crude reaction product may be further treated to reduce any color developed during the heating. For example it may be bleached by (a) dissolving the product, if soluble, in water and contacting the solution with activated carbon or charcoal or (b) treating the product with sodium chlorite or hypochlorite, hydrogen peroxide or other bleaching agents as used in the bleaching of flour. If the product contains excess edible acid and it is desired to reduce the acid content, it may be dissolved or suspended in water, bleached if necessary, and then neutralized, e.g. with sodium hydroxide or sodium carbonate, until an acceptable pH value is reached, and then evaporated and/or filtered and dried to give a purified product.

The non-digestible food additives produced by the process of the invention are useful for replacing wholly or in part the carbohydrates and/or fat content of foods, thereby providing dietetic foods of low calorie content. In particular, those which are substantially insoluble or have a low water up-take may be used as substitutes for flour and other starch-containing natural products, in cakes, biscuits, cookies, pastries, and other baked products, as well as unleavened products including pastas, e.g. spaghetti. Those which have a higher water up-take may be used as substitutes for potato starch in "instantized" and "snack" products including "instant" mashed potato and crisps.

Thus the invention also provides novel food compositions comprising the product of a process according to the invention.

At high starch replacement levels, particularly when more than 50% of the starch is replaced by a non-digestible food additive produced by the process of the invention, it has been found advantageous in order to produce a more acceptable food product, to add a small proportion of an emulsifying agent and this helps to retain a desirable crumbly texture in the finished food product. For example, we have found that lecithin may be added at a level of from 0.5 to 3%, and preferable at a level of 2% based on the dry weight of the composition, for this purpose.

The following are Examples of the preparation of products according to the invention and of food compositions comprising such products. All temperatures are given in °C.

EXAMPLE 1

Raw maize starch powder of average particles diameter about 25 microns, containing about 10% moisture, was dried in an oven at 60° to reduce its water content to 1% by weight. The dried powder (170 g) was then blended with anhydrous citric acid powder of average particle diameter about 150 microns (30 g) in conventional blending apparatus to give a homogeneous mixture. The mixture was then heated in a glass flask at 180° on an oil bath at a pressure of 50 mm mercury (maintained by a vacuum pump) for 3 hours. Samples taken at intervals during the heating period showed that proportion of the product hydrolyzable by α-amylase was progressively reduced until at the end of the period it was only 4%. The proportion of water-soluble material was also progressively reduced to 10%.

After cooling to room temperature, the product (180 g) was suspended twice in water (820 ml) and filtered, re-suspended in water (820 ml), bleached by adding 72 ml of a 10% aqueous solution of sodium chlorite, neutralized to pH 6 by addition of 10% aqueous sodium carbonate, filtered, washed with water and dried to give 160 g of a pale cream-colored product, only 1% of which was hydrolyzable by α-amylase and which was insoluble in water.

EXAMPLES 2-4

Example 1 was repeated using different proportions of starch to citric acid and the heating period at 180° required to reduce the proportion of the product hydrolyzable by α-amylase to less than 5% is shown in the following table, in which Example 1 is included for comparison.

| Example | Starch: citric acid (by wt.) | Period at 180° (hrs) |
|---------|------------------------------|----------------------|
| 2       | 80 : 20                      | 2                    |
| 1       | 80 : 15                      | 3                    |
| 3       | 90 : 10                      | 7                    |
| 4       | 95 : 5                       | 24                   |

The products in each case contained less than 10% water-soluble material. After treatment as in Example 1, the final products were in each case pale cream-colored, insoluble in water and only 1% hydrolyzable by α-amylase.

EXAMPLE 5

Raw maize starch as used in Example 1 (170 g) was agitated in a suitable vessel and a solution of citric acid (30 g) in water (100 ml) was sprayed onto the agitated starch powder so as to give a uniform distribution of citric acid in the starch powder. During the spraying operation the powder in the vessel was maintained at 60°–70° to reduce the water content of the product to 1% by weight. The product (180 g) was then milled to a particle size of less then 250 micron diameter and heated to 180° for 3 hours as in Example 1 to give a similar product.

EXAMPLE 6

Raw maize starch as used in Example 1 (170 g) was dispersed in water (130 ml) with efficient agitation. To this dispersion was added citric acid (30 g) and agitation was continued to ensure thorough dissolution and distribution of the citric acid. This slurry was then dried to 1% water content in a hot air circulation oven at 70° for 6 hours, or alternatively by passing it as a thin film over a heated roller drier at 120°. The dried product (180 g) was then milled to particle size of less than 250 microns diameter and heated to 180° for 3 hours as in Example 1 to give a similar product.

EXAMPLE 7

Raw maize starch (150 g) was dispersed in water (1 liter) and anhydrous citric acid (7.5 g) was added. After efficient agitation, the mixture was heated to boiling and refluxed for 8 hours. A sample was then found to have a dextrose equivalent of 19.4. A further 15 g of anhydrous citric acid was then added, with efficient agitation, and the product was then evaporated to about 25% solids content, by heating at 40° under vacuum, and spray-dried in conventional spray-drying apparatus, using an air inlet temperature of 150°–170° and an outlet temperature of about 100°. The product, which now had a water content of less than 5%, was then heated at 180° as in Example 1, but a period of 6 hours was found to be necessary to reduce the proportion of product hydrolyzable by α-amylase to less than 5%. The product, which contains less than 10% soluble material, was treated as in Example 1 to yield a similar final product.

EXAMPLE 8

The procedure of Example 7 was repeated, except that the period of refluxing of the starch with citric acid was increased to 12 hours, to form a product having a dextrose equivalent of 26.0. A period of only 2 hours was then found to be necessary to reduce the proportion of product hydrolyzable by $\alpha$-amylase to less than 5%. The product, which contains less than 10% soluble material, was treated as in Example 1 to yield a similar final product.

EXAMPLES 9 TO 12

The procedure of Example 7 was repeated on a larger scale and the period of refluxing was increased to 15 hours to form a product having a dextrose equivalent of 28. The product of refluxing was separated into four fractions and to three of the fractions was added amounts of anhydrous citric acid to increase the citric acid content (based on the total solids content) to 8.4%, 10.9% and 15.9%, respectively. No citric acid was added to the fourth fraction. Each fraction was then evaporated, spray-dried and heated at 180° as in Example 7. The period of heating necessary to reduce the proportion of product hydrolyzable by $\alpha$-amylase to less than 5% is shown in the following table. The products, which contained the amounts of water-soluble material shown in the table, were treated as in Example 1 to yield similar final products.

| Example | Total citric acid content (%) | Period at 180° (hours) | % water-soluble |
|---|---|---|---|
| 9 | 5 | 24 | 80 |
| 10 | 8.4 | 21 | 85 |
| 11 | 10.9 | 6 | 85 |
| 12 | 15.9 | 2 | 90 |

EXAMPLE 13 TO 15

Commercially available glucose syrups (starch hydrolysates) having dextrose equivalents of 42.0, 53.6 and 63, respectively, (100 g of each) were each mixed with 5 g of anhydrous citric acid dissolved in the minimum quantity of water. A sample of each mixture was then heated slowly from 20° to 180° on an oil bath over a period of 1½ hours, under a pressure of 50 mm of mercury, thereby ensuring that the water content of the mixture was reduced to less than 5% by weight by the time the temperature reached 140°, and then cooled. Further samples were heated in the same way and then held at 180° for 15 minutes before cooling. It was found that the proportion of product hydrolyzable by $\alpha$-amylase is reduced to less than 5% by heating the samples derived from the starch hydrolysates having dextrose equivalents of 53.6 and 63° to 180° in the manner described, and then cooling, while the sample derived from the starch hydrolysate having a dextrose equivalent of 42 required a period of 15 minutes at 180° before cooling.

The products derived from the starch hydrolysates having dextrose equivalents of 53.6 and 63 are completely soluble in water, while that derived from the starch hydrolysate having a dextrose equivalent of 42 is 70% soluble in water. The water-soluble products were recovered by evaporation, while the partially soluble product was treated as in Example 1 to yield an isoluble fraction and a soluble fraction which also was recovered by evaporation.

EXAMPLES 16 TO 18

The procedure of Example 6 was repeated using different proportions of starch to citric acid and an oil bath heating temperature of 195° instead of 180°. The period required to reduce the proportion of the product hydrolyzable by $\alpha$-amylase to less than 5% is shown in the following table.

| Example | Starch: citric acid (by wt.) | Period at 195° (hours) |
|---|---|---|
| 16 | 85 : 15 | 2 |
| 17 | 90 : 10 | 6 |
| 18 | 95 : 5 | 12 |

The products in each case contained less than 10% soluble material and were treated as in Example 1 to yield similar final products.

EXAMPLE 19

The procedure of Example 7 was repeated but using 950 g raw maize starch and 50 g citric acid and the period of refluxing was increased to 20 hours to form a product having a dextrose equivalent of 37. Citric acid was added to increase the citric acid content to 15.9% (based on the total solids content) and the solution was then evaporated and spray-dried as described in Example 7. The residue was heated under vacuum at 180° for 2 hours to give a product which was bleached, neutralized, washed and dried as described in Example 1 to yield a similar final product (760 g).

EXAMPLE 20

Citric acid (6 kg) was dissolved in water (74 l) and raw maize starch (34 kg) was added with stirring. The mixture was heated to boiling over the course of one hour and was maintained at this temperature for a further 45 minutes before cooling and spray-drying as described in Example 7. A sample of the solid residue (1 kg), which has a dextrose equivalent of 12 was heated under vacuum at 180° as in Example 1 for 2¼ hours to give a product (940 g) which was bleached, neutralized, washed and dried as described in Example 1, to yield a final product (850 g) which contained less than 0.1% soluble material and which was essentially non-hydrolyzable by $\alpha$-amylase.

EXAMPLE 21

Raw maize starch (2295 g) was dispersed in water (9 l) and anhydrous citric acid (405 g) was added. The mixture was agitated and heated to boiling. After refluxing for 5 hours a sample was found to have a dextrose equivalent of 36 and the solution was then cooled and spray-dried as described in Example 7. A sample of the product (200 g) with a water content less than 5% was heated under vacuum at 180° as in Example 1 for 2 hours to yield a product of which only 0.32% was digestible by $\alpha$-amylase and which was >90% insoluble in water.

EXAMPLE 22

Raw maize starch (1020 g) was added to a solution of adipic acid (180 g) in water (13.2 l) and the mixture was stirred and heated to 100° C. The mixture was held at this temperature for 1 hour before being cooled and spray-dried. The resulting solid (1040 g) which has a water content less than 5% was heated under vacuum at 180° as in Example 1 for 3 hours. After cooling the crude product was bleached, neutralized and dried as described in Example 1 to give 856 g of a product only 3.4% of which was hydrolyzable by α-amylase and which was 99% insoluble in water.

EXAMPLE 23

The procedure of Example 22 was repeated but using 425 g raw maize starch and 75 g succinic acid dissolved in 2 l water. The solid residue obtained after spray-drying was heated under vacuum at 180° for a period of 4 hours to give a product of which 2.8% was hydrolyzable by α-amylase and which was 95% insoluble in water.

EXAMPLE 24

The procedure of Example 23 was repeated but starting with 262.5 g raw maize starch and 37.5 g fumaric acid dissolved in 7.5 l water. The solid residue obtained after spray-drying was heated under vacuum at 180° for 4 hours to give a product of which 4.2% was hydrolyzable by α-amylase and which was 85% insoluble in water.

EXAMPLE 25

Raw maize starch (170 g) was added to a solution of citric acid (30 g) in water (100 ml) with stirring and the resulting slurry was dried in trays in an oven at 50°-60° C. The dried product was milled to a particle size of less than 250 microns diameter. The product was heated under vacuum as in Example 1, but at 165° instead of at 180°. Samples were removed at intervals and the percentage hydrolyzable by α-amylase were determined. The results are shown in the following table from which it will be seen that a period of 5 hours was required at 165° to reduce the proportion of product hydrolyzable by α-amylase to less than 5%.

| Period at 165° (hours, minutes) | % hydrolyzable by α-amylase |
|---|---|
| 0, 00 | 69 |
| 0, 55 | 46 |
| 2, 20 | 32 |
| 2, 55 | 27 |
| 3, 40 | 16 |
| 4, 05 | 13 |
| 5, 00 | <5 |

This may be compared with Examples 6 and 16, where corresponding periods were 3 hours at 180° and 2 hours at 195°.

EXAMPLE 26

A cake mix was prepared having the following composition:

| | g. |
|---|---|
| Cake flour | 30 |
| Product of Example 6 | 27 |
| Gluten | 3 |
| Margarine | 40 |
| Castor sugar | 40 |
| Fresh whole egg | 40 |
| Baking powder | 2 |
| Fresh milk | 20 |
| Total weight | 202 |

After mixing, and baking in conventional manner at 193°, a cake was produced of a good taste, texture and appearance, comparable with a cake produced from a similar mix containing 60 g cake flour, but no product of Example 6, gluten or milk. (Gluten is included in the mix to maintain the protein content equal to that of cake flour and milk to provide additional moisture). The cake product of this Example has, however, a calorie content of only 3.48 Cal/g., cooked weight, compared with the product containing 60 g cake flour which has a calorie content of 4.32 Cal/g., a reduction of 19%.

EXAMPLE 27

A ginger biscuit mix was prepared having the following composition:

| | g. |
|---|---|
| Plain flour | 45.4 |
| Product of Example 6 | 68.2 |
| Modified polydextrose[1] | 77.4 |
| Fresh whole egg | 28.4 |
| Ground ginger | 4.0 |
| Sodium bicarbonate | 2.0 |
| Water | 14.9 |
| Margarine | 42.6 |
| Calcium cyclamate | 0.5 |
| Total weight | 283.4 |

[1] A product made by heating 90% by weight of glucose with 1% by weight of citric acid and 9% by weight of sorbitol, to produce a water-soluble product in accordance with the procedure described in U.S. Pat. No. 3,766,165.

After mixing and baking in conventional manner at 177°, biscuits were produced which were of acceptable taste, texture and appearance, comparable with biscuits produced from a similar mix containing 113.6 g plain flour, 42.6 g castor sugar and 49.7 golden syrup, but no product of Example 6, modified polydextrose, water or calcium cyclamate, and 5 g ground ginger instead of only 4 g. The biscuit products of this Example have a total calorie content of only 630, compared with the products containing 113.6 g plain flour (as well as sugar and syrup) which have a total calorie content of 1108, a reduction of 43%.

EXAMPLE 28

A "Lincoln" biscuit mix was prepared having the following composition:

| | g. |
|---|---|
| Plain flour | 50.0 |
| Product of Example 6 | 50.0 |
| Modified polydextrose[2] | 29.0 |
| Margarine | 32.0 |
| Skimmed milk powder | 1.8 |
| Salt | 1.0 |
| Sodium bicarbonate | 0.45 |
| Ammonium bicarbonate | 0.15 |
| Water | 10.0 |
| Calcium cyclamate | 0.5 |
| Total weight | 174.9 |

[2] As in Example 27.

After mixing and baking in conventional manner at 177°, biscuits were produced which were of acceptable taste, texture and appearance, comparable with biscuits produced from a similar mix containing 100 g plain flour and 29 g pulverized sugar, but no product of Example 6, modified polydextrose or calcium cyclamate. The biscuit products of this Example have a total calorie content of only 463, compared with the products containing 100 g plain flour (as well as sugar) which have a total calorie content of 722, a reduction of 36%.

EXAMPLE 29

A pasta mix was prepared having the following composition:

|  | Control g. | Ex. 29 g. |
| --- | --- | --- |
| Plain flour | 113.6 | 63.6 |
| Water | 46.6 | 46.6 |
| Cooking oil | 23.3 | 20.0 |
| Modified polydextrose[2] | — | 13.3 |
| Product of Example 12 | — | 36.0 |
| Egg Yolk (fresh) | 10.0 | 10.0 |
| Gluten | — | 4.0 |
| Butter | 7.1 | 7.1 |
| Salt | 2.0 | — |
| Total weight | 202.6 | 202.6 |

[2]See Example 27

After mixing and cooking in conventional manner a ravioli pasta was produced of comparable taste, texture and appearance to the control but having a calorie content of only 529, compared to the control which had a calorie content of 703, a reduction of 25%.

EXAMPLE 30

A gingerbread mix was prepared having the following composition:

|  | Control g. | Ex. 30 g. |
| --- | --- | --- |
| Modified polydextrose[2] | — | 96.56 |
| Brown sugar | 56.8 | — |
| Egg Albumen | — | 4.26 |
| Cake flour | 113.6 | 56.80 |
| Gluten | — | 1.42 |
| Butter | 56.8 | 56.8 |
| Ginger | 5.0 | 5.0 |
| Fresh Milk | 70.0 | 70.0 |
| Sodium Bicarbonate | 2.0 | 2.0 |
| Fresh Whole Egg | 14.0 | 14.0 |
| Black Treacle | 56.8 | 56.8 |
| Golden Syrup | 56.8 | — |
| Water | — | 10 |
| Brown Sugar Flavor | — | 1 drop |
| Sodium Cyclamate | — | 1.0 |
| Product of Example 6 | — | 51.12 |
| Total weight | 431.8 | 425.8 |

[2]See Example 27

After mixing and baking in convention manner a gingerbread was produced of good taste, texture and appearance, comparable with the control, but having a 32% reduction in calorie content.

EXAMPLES 31-33

A Lincoln biscuit mix was prepared having the following composition:

|  | Control g. | Ex. 31 g. | Ex. 32 g. | Ex. 33 g. |
| --- | --- | --- | --- | --- |
| Plain flour | 3360 | 2520 | 1680 | 1680 |
| Product of Example 6 | — | 756 | 1512 | — |
| Product of Example 19 | — | — | — | 1512 |
| Dried gluten | — | 84 | 168 | 168 |
| Skimmed milk powder | 60.5 | 60.5 | 60.5 | 60.5 |
| Salt | 33.6 | 33.6 | 33.6 | 33.6 |
| Sodium bicarbonate | 15 | 15 | 15 | 15 |
| Ammonium bicarbonate | 5 | 5 | 5 | 5 |
| Sodium cyclamate | — | — | 25.2 | 25.2 |
| Pulverized sugar | 974 | 974 | — | — |
| Fat | 1075 | 1075 | 1075 | 1010 |
| Lecithin | — | 84 | 84 | 31 |
| Modified polydextrose[2] | — | — | 974 | 974 |
| Water | 336 | 874 | 1008 | 1008 |
| Total weight | 5859 | 6481 | 6640 | 6522 |

[2]See Example 27

After mixing and baking in a conventional manner at 177°, biscuits were produced which were of acceptable taste, texture, and appearance, comparable with biscuits produced from the control mix but having a reduction in calorie content of 22%, 42% and 44%, respectively, for Examples 31, 32 and 33.

EXAMPLE 34

A fruit cake mix was prepared having the following compositions:

|  | Control g. | Ex. 34 g. |
| --- | --- | --- |
| Plain flour | 227.2 | 113.6 |
| Castor sugar | 142.0 | 71.0 |
| Modified polydextrose[2] | — | 99.4 |
| Margarine | 113.6 | 85.2 |
| Fresh Whole Egg | 113.6 | 113.6 |
| Dried Fruit | 227.2 | 227.2 |
| Fresh Milk | 94.0 | 94.0 |
| Egg Albumen | — | 8.52 |
| Gluten | — | 2.84 |
| Mixed Spice | 2.00 | 2.00 |
| Baking Powder | 7.00 | 7.00 |
| Sodium Cyclamate | — | — |
| Product of Example 6 | — | 102.4 |
| Water | — | 10.0 |
| Total weight | 926.6 | 927.7 |

[2]See Example 27

After mixing and baking in conventional manner a cake was produced of a good taste, texture and appearance, comparable with the control cake, but having a reduction in calorie content of 27%.

EXAMPLE 35

A sponge cake mix was prepared having the following composition:

|  | Control g. | Ex. 35 g. |
| --- | --- | --- |
| Cake flour | 100 | 50 |
| Product of Examples 6 or 12 | — | 41.3 |
| Solid Albumen | — | 8.7 |
| Lecithin | — | 6.5 |
| Fresh Whole Egg | 60 | 60 |
| Ground-nut oil | 15 | 15 |
| Baking powder | 5 | 5 |
| Salt | 1 | 1 |
| Castor sugar | 105 | 52.5 |
| Modified polydextrose[2] | — | 52.5 |
| Sodium cyclamate | — | 1.0 |
| Skimmed milk powder | 8 | 8 |
| Glycol mono-stearate | 2.6 | — |
| Water | 50 | 75 |
| Total weight | 346.6 | 376.5 |

[2]See Example 27

After mixing and baking in conventional manner a sponge cake was produced of a good taste, texture and appearance, comparable with the control cake but having a reduction in calorie content of 32%.

What is claimed is:

1. A process for preparing a non-digestible food additive which comprises heating a mixture of starch with a member selected from the group consisting of edible di- and tribasic carboxylic acids and anhydrides thereof at a temperature of from about 140° to 220° C. under reduced pressure for a period sufficient to form a non-digestible product as determined by its resistance to the action of amylolytic enzymes, said mixture having prior to and during said heating a moisture content of less than 5% by weight of water and containing from 1 to 25% by weight of said edible acid or an equivalent amount of anhydride thereof based on the total weight of said mixture before said heating.

2. A process according to claim 1, in which said edible acid is a tri-basic carboxylic acid.

3. A process according to claim 2, in which said edible acid is citric acid.

4. A process according to claim 1, in which said mixture contains from 5 to 15% by weight of said edible acid.

5. A process according to claim 1, in which said water content of said mixture prior to and during heating is less than 2% by weight.

6. A process according to claim 1, in which said water content of said mixture prior to said heating is reduced by heating the mixture at a temperature of from about 60° to 120° C.

7. A process according to claim 1, in which said heating is carried out under a pressure of less than 100 mm of mercury.

8. A process according to claim 1, in which the said mixture is heated in the liquid state at a temperature of from about 140° to 180° C.

9. A process according to claim 1, in which said mixture is heated in the solid state at a temperature of from about 165° to 220° C.

10. A process according to claim 1, in which said mixture is prepared by dispersing starch in an aqueous solution of said edible acid and drying the slurry so formed.

11. A process according to claim 11, in which the slurry or solution in spray dried.

12. The product of the process of claim 1 wherein not more than 15% of said product is hydrolyzable by amylolytic enzymes.

13. A product as claimed in claim 15, in which the edible acid is citric acid.

14. A food composition containing the product of claim 15.

* * * * *